United States Patent
Sun et al.

(10) Patent No.: US 9,470,811 B2
(45) Date of Patent: Oct. 18, 2016

(54) CREATING A HIGH RESOLUTION VELOCITY MODEL USING SEISMIC TOMOGRAPHY AND IMPEDANCE INVERSION

(71) Applicants: Yonghe J. Sun, Cypress, TX (US); Michael Gordon Greene, Sugar Land, TX (US)

(72) Inventors: Yonghe J. Sun, Cypress, TX (US); Michael Gordon Greene, Sugar Land, TX (US)

(73) Assignee: CHEVRON U.S.A. INC., San Ramon, CA (US)

( * ) Notice: Subject to any disclaimer, the term of this patent is extended or adjusted under 35 U.S.C. 154(b) by 218 days.

(21) Appl. No.: 14/539,630

(22) Filed: Nov. 12, 2014

(65) Prior Publication Data

US 2016/0131781 A1 May 12, 2016

(51) Int. Cl.
*G01V 1/28* (2006.01)
*G01V 1/40* (2006.01)
*G01V 1/30* (2006.01)

(52) U.S. Cl.
CPC .............. *G01V 1/282* (2013.01); *G01V 1/306* (2013.01); *G01V 1/303* (2013.01); *G01V 1/40* (2013.01); *G01V 2210/6169* (2013.01); *G01V 2210/626* (2013.01); *G01V 2210/6222* (2013.01); *G01V 2210/6226* (2013.01); *G01V 2210/74* (2013.01)

(58) Field of Classification Search
CPC ...... G01V 1/306; G01V 1/282; G01V 1/303; G01V 2210/6222; G01V 2210/626; G01V 1/40; G01V 2210/6226; G01V 2210/74; G01V 2210/6169
USPC ........................................ 367/7, 73
See application file for complete search history.

(56) References Cited

U.S. PATENT DOCUMENTS 8,121,791 B2 2/2012 Lazaratos et al.
8,363,509 B2 1/2013 Colombo et al.
(Continued)

FOREIGN PATENT DOCUMENTS

WO 2013009944 1/2013

OTHER PUBLICATIONS

Guillaume, et al., "Geologically consistent velocities obtained by high definition tomography", Society of Exploration Geophysics, San Antonio, TX, pp. 4061-4065, 2011.
Guillaume, et al., "Kinematic invariants: an efficient and flexible approach for velocity model building", Society of Exploration Geophysics, Las Vegas, NV, pp. 3687-3692, 2008.
(Continued)

*Primary Examiner* — Daniel L Murphy
(74) *Attorney, Agent, or Firm* — Marie L. Clapp

(57) ABSTRACT

A method is described for of creating a high-resolution velocity model of a geological medium that includes generating a long-wavelength anisotropic velocity model using tomographic inversion of seismic data gathers and combining the long-wavelength velocity model with an attenuation model. The method further includes performing prestack depth migration on the seismic data gathers using the long-wavelength velocity and attenuation model to produce seismic image gathers, applying a dip-consistent filter to the seismic image gathers, and transforming the filtered seismic image gathers to the time domain. The method further includes generating a full-band impedance model by performing impedance inversion of the time-domain filtered seismic image gathers using the long-wavelength velocity and attenuation model. The full-band impedance or velocity model is calibrated in the frequency domain in a manner independent of the spatial coordinates. The full-band impedance or velocity model is used for detecting fluid pressure anomalies in the geological medium.

20 Claims, 2 Drawing Sheets

(56) References Cited

U.S. PATENT DOCUMENTS

| | | |
|---|---|---|
| 8,406,081 B2 | 3/2013 | Xia et al. |
| 8,542,554 B2 | 9/2013 | Thomson et al. |
| 8,547,793 B2 | 10/2013 | Bjerkholt |
| 2011/0235464 A1 | 9/2011 | Brittan et al. |
| 2011/0292761 A1 | 12/2011 | Jiao et al. |
| 2012/0307593 A1 | 12/2012 | Guillaume et al. |
| 2013/0179137 A1 | 7/2013 | Mullur et al. |
| 2013/0322212 A1 | 12/2013 | Pica et al. |

OTHER PUBLICATIONS

Jiuying Guo, et al., "Towards Accurate Velocity Models by 3D Tomographic Velocity Analysis", $64^{th}$ EAGE Conference, Florence, Italy, pp. 1-4, May 2002.

Gary F. Margrave, et al., "Full waveform inversion with wave equation migration and well control", CREWES Research Report, 2010.

William W. Symes., "Migration velocity analysis and waveform inversion", Geophysical Prospecting, vol. 56, No. 6, pp. 765-790, 2008.

CREATING A HIGH RESOLUTION VELOCITY MODEL USING SEISMIC TOMOGRAPHY AND IMPEDANCE INVERSION

TECHNICAL FIELD

The disclosed embodiments relate generally to techniques for using geophysical seismic data to build velocity models for geological media, and in particular, to a method of creating a high-resolution velocity model by combining the result from seismic tomography and impedance inversion.

BACKGROUND

Seismic exploration involves surveying subterranean geological media for hydrocarbon deposits. A survey typically involves deploying seismic sources and seismic sensors at predetermined locations. The sources generate seismic waves, which propagate into the geological medium creating pressure changes and vibrations. Variations in physical properties of the geological medium give rise to changes in certain properties of the seismic waves, such as their direction of propagation and other properties.

Portions of the seismic waves reach the seismic sensors. Some seismic sensors are sensitive to pressure changes (e.g., hydrophones), others to particle motion (e.g., geophones), and industrial surveys may deploy one type of sensor or both. In response to the detected seismic waves, the sensors generate corresponding electrical signals, known as traces, and record them in storage media as seismic data.

One goal of seismic exploration is drilling hazard prediction and mitigation. Such drilling hazards are present, for example, when a region of a porous material in a geological medium has an abnormally high fluid pressure. An abnormally high fluid pressure is often indicated by lower wave velocity (e.g., s-wave or p-wave velocity) than the trend corresponding to normal pressured fluid. Some conventional approaches use imaging velocity analysis of seismic data (e.g., tomographic inversion) for drilling hazard prediction and mitigation. Seismic migrations of various types (e.g., Kirchhoff prestack depth migration, reverse-time migration) are currently the methods of choice for seismic imaging. Migration velocity analyses oftentimes adjust the seismic imaging velocity iteratively, by maximizing imaging focusing or aligning imaging gathers (i.e., minimizing residual moveout, or image misalignment, in prestack imaging gathers). Unfortunately, these conventional methods of imaging velocity analysis (e.g., methods of creating a velocity model of a geological medium using seismic data collected from the region for best imaging) are not optimized for hazard prediction and do not yield sufficient resolution to predict drilling hazards that occur on smaller, laterally extended (e.g., three-dimensional), length-scales. Thus, hazards remain.

SUMMARY

Accordingly, there is a need for velocity models that can be used to predict drilling hazards such as fluid pressure anomalies. Such velocity models can include P-wave velocity models, S-wave velocity models, and/or models of other rock characteristics related to velocity or sensitive to fluid pressure, such as impedance models.

In accordance with some embodiments, a method of creating a high-resolution velocity model of a geological medium from seismic data is performed at a computer system with one or more processors and memory. The method includes generating a long-wavelength anisotropic velocity model by performing a tomographic inversion of one or more seismic data gathers using moveout data derived from the one or more seismic imaging data gathers. The method further includes accessing an attenuation model that includes frequency-dependent attenuation factors for each of a plurality of locations in the geological medium and correlating the long-wavelength velocity model with the attenuation model to produce a long-wavelength velocity and attenuation model. The method still further includes performing prestack depth migration on the one or more seismic data gathers from a time domain to a depth domain using the long-wavelength velocity and attenuation model to produce one or more seismic image gathers. The method still further includes applying a dip-consistent filter to the one or more seismic image gathers to produce one or more filtered seismic image gathers and transforming the one or more filtered seismic image gathers from the depth domain to the time domain. The method still further includes generating a full-band impedance model for the geological medium by performing impedance inversion of the one or more filtered seismic image gathers in the time domain using the long-wavelength velocity and attenuation model. The method still further includes conversion of the full-band impedance into the full-band velocity. The method still further includes spatial position-independent calibration of the spectral shape of either the full-band impedance before impedance-to-velocity conversion or full-band velocity after conversion at well locations or at high-contrast reflection horizons (i.e., water bottom or top of salt) with strong and known amplitude signatures. The full-band impedance model is used for detecting fluid pressure anomalies in the geological medium.

In another aspect of the present invention, to address the aforementioned problems, some embodiments provide a non-transitory computer readable storage medium storing one or more programs. The one or more programs comprise instructions, which when executed by a computer system with one or more processors and memory, cause the computer system to perform any of the methods provided herein.

In yet another aspect of the present invention, to address the aforementioned problems, some embodiments provide a computer system. The computer system includes one or more processors, memory, and one or more programs. The one or more programs are stored in memory and configured to be executed by the one or more processors. The one or more programs include an operating system and instructions that when executed by the one or more processors cause the computer system to perform any of the methods provided herein.

BRIEF DESCRIPTION OF THE DRAWINGS

Like reference numerals refer to corresponding parts throughout the drawings.

DETAILED DESCRIPTION OF EMBODIMENTS

Figure 1:
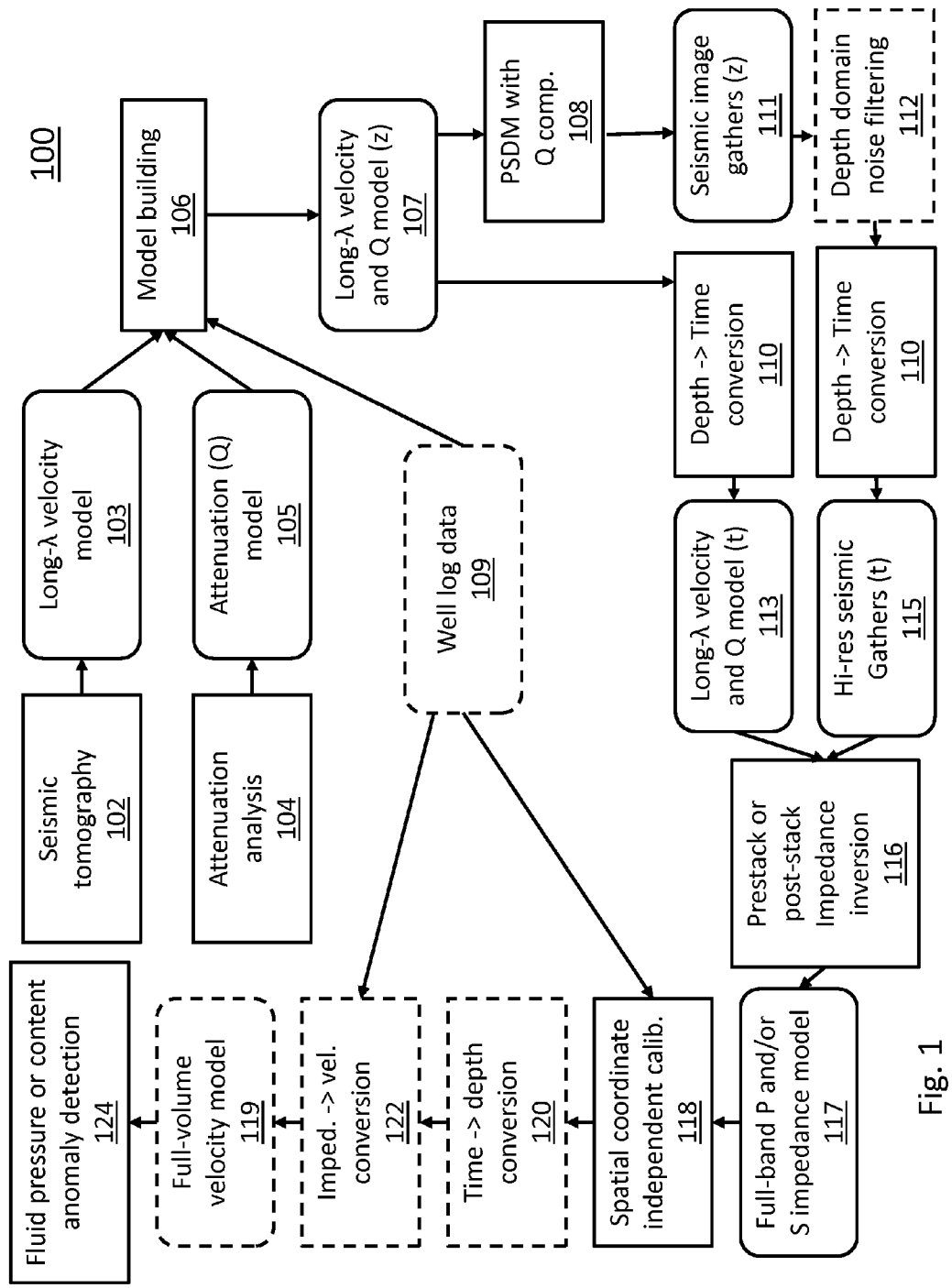
FIG. 1 illustrates a flowchart of a method of creating a high-resolution velocity model of a geological medium from seismic data, in accordance with some embodiments.

Described below are methods, systems, and computer readable storage media that provide a manner of creating a high-resolution velocity model combining tomography with seismic inversion. To this end, seismic tomography techniques such as migration velocity analysis are used, in some embodiments, to generate a low-resolution background velocity model for a volume representing a geological medium. The low-resolution background velocity model is used, in turn, as an input to jump start impedance inversion and obtain a high-resolution velocity model. The high-resolution velocity model is used for drilling hazard prediction and mitigation by detecting regions of the volume of the geological medium that have velocities anomalously lower than the background trend, since low velocity anomalies can be caused by anomalously high fluid pressure (e.g. drilling hazards).

Reference will now be made in detail to various embodiments, examples of which are illustrated in the accompanying drawings. In the following detailed description, numerous specific details are set forth in order to provide a thorough understanding of the present disclosure and the embodiments described herein. However, embodiments described herein may be practiced without these specific details. In other instances, well-known methods, procedures, components, and mechanical apparatus have not been described in detail so as not to unnecessarily obscure aspects of the embodiments.

In some circumstances, the geological medium includes fluid pressure anomalies that represent drilling hazards. In some circumstances, fluid pressure anomalies are characterized by anomalously low velocities (e.g., S-wave velocities or P-wave velocities). To that end, one goal of some embodiments of the present disclosure is to generate velocities with resolution that is sufficient to predict and mitigate drilling hazards by locating fluid pressure anomalies.

Well-log data is another type of geophysical data that is available, in some circumstances, to help understand a geological medium. For example, well-log data is used in some embodiments to calibrate velocity models generated from seismic data. Well-log data can also complement seismic data, for example, when converting from an impedance model to a velocity model.

Many other types of well-log sensors and/or combinations of sensor types can be employed. For example, some types of well-log data require core removal at select locations along the borehole followed by analysis of said cores in a laboratory setting. Also, in accordance with various embodiments, well-logging can be performed in a logging while drilling (LWD) configuration or can be performed after drilling the borehole. These embodiments are not described in detail for the sake of brevity, but are nonetheless intended to fall within the scope of the appended claims.

In many circumstances, additional properties of the geological medium are derivable from quantities measured by a well-log sensor. For example, acoustic impedance values from an acoustic impedance sensor and density values from a density sensor can be combined to calculate velocity values because velocity is related to impedance and density by the equation:

$$Z = \rho v, \quad (1)$$

where $Z$ is a respective impedance value for a location within the geological medium, $\rho$ is a respective density value for the location, and $v$ is a respective velocity value for the location. It should be appreciated that the impedance values and velocity values referred to above may be of any mode. For example, the impedance values and velocity values may refer to P-wave modes and/or S-wave modes.

A goal of geophysical exploration is to build up an image of a survey area for the purposes of identifying subterranean geological features (e.g., hydrocarbon deposits/reservoirs). To that end, an intermediate goal is to develop an accurate velocity model by picking moveout characteristics of one or more seismic data gathers. While, in some circumstances, picking moveout characteristics provides velocity models with sufficient resolution to flatten the moveout, and thus provides sufficient resolution to make seismic data "stackable" as explained below, the resolution is often insufficient for locating fluid pressure anomalies (e.g., fluid pressure anomalies). The methods described herein combine tomographic techniques that include moveout picking with impedance inversion techniques that increase the resolution of velocity models so that low-velocity regions representing drilling hazards can be detected and avoided.

Seismic imaging, one of the tools of seismic exploration, requires an accurate velocity model to fully focus reflections and correctly position reflectors in the subsurface. Detailed information can be retrieved from seismic data. Velocity estimation is based on the redundant illumination of reflectors that is provided by multi-offset seismic data. A fundamental principle underlying one type of velocity estimation methods (known as "tomographic inversion") is that the correct velocity must accurately explain the relative time delays (represented in the so-called "moveout") between reflections that are originated from the same horizon in the geological medium, but were reflected with different angles at the reflection point. Thus, tomographic inversion makes use of arrival times in order to derive a velocity model. Another technique, known as "impedance inversion," analyzes reflected amplitudes in order to gain information about a geological medium's variations in velocity structure.

In the absence of inelastic attenuation (e.g., Q-factor attenuation or "lossy" attenuation), and in the absence of geometrical spreading effects, the amplitudes of the reflected and transmitted waves at zero incident angle are, in some circumstances, given by:

$$A_r = \left(\frac{Z_1 - Z_2}{Z_1 + Z_2}\right) A_i, \quad (2)$$

$$A_t = \left(\frac{2Z_1}{Z_1 + Z_2}\right) A_i, \quad (3)$$

where $Z_1$ and $Z_2$ are the impedances of the first stratus and the second stratus, respectively (e.g., given by Eq. (1)), $A_r$ is the amplitude of the reflected acoustic signal, $A_t$ is the amplitude of the transmitted acoustic signal, and $A$ is the amplitude of the incident acoustic signal. Thus, the respective amplitudes are useful for inferring high-resolution, or "short-wavelength," components of an impedance that cause reflections, e.g., using Eqs. (2) and (3) above. Not shown in the above equations is angle-dependent reflectivity, which allows the inference of P-impedances, S-impedances, and densities if the reflection data are available for sufficiently large range of reflection angles.

Because the amplitudes depend on sharp features (e.g., horizons) in the impedance structure of the geological medium (which, in turn, depends on sharp features in the velocity structure), the amplitudes of a seismic gather are used in some embodiments to generate a high-resolution model for the velocity structure (i.e., a velocity model) in a process called impedance inversion.

In accordance with a variety of implementations, several operations are optionally performed in order to determine information corresponding to the incident amplitude in Eqs. (2) and (3) above. For example, in some implementations, a wavelet corresponding to a source signal is designed by matching seismic data to synthetic data computed using well-log derived velocities (e.g., velocities derived from a well-log sensor). In some implementations, an attenuation model is used to account for losses in the incident acoustic waves and reflected acoustics waves. In some embodiments, geometrical spreading is compensated for.

When moveout characteristics or curves from a plurality of events (e.g., reflections from a plurality of horizons) are obtained from a seismic data gather, tomographic inversion of the seismic data gather can be performed to obtain an initial estimate of a velocity model, which is a two- or three-dimensional representation of the velocity at predetermined locations within the volume of the geological medium (e.g., a velocity is determined for each point on a mesh, sometimes called a computational grid). The methods described herein combine the result of tomographic inversion with impedance inversion, which allow such velocity models to be more accurately constructed and refined than velocity models derived from conventional tomographic alone.

An accurate velocity model is needed, among other reasons, for seismic imaging. Seismic imaging sometimes starts with "stacking" data, which means adding together a number of traces (e.g., migrated traces) using simple assumption of traveltime variations with offsets. One approach is called normal moveout (NMO) analysis and the velocity that optimizes the stacking power is called the NMO velocity. This stacking generally involves adding the same time or depth sample on each trace together to create a stacked amplitude at each time or depth sample in a stacked trace. In general, the traces that are stacked together represent different offset or angle values for a particular geographic location. In many cases, NMO analysis and inversion is insufficient to produce an accurate enough velocity model for depth imaging, especially for imaging in areas with complex goelogy.

Some methods analyze what remains of the moveout characteristics or curves after normal moveout correction has been performed (e.g., the so-called "residual moveout") as a way to improve the velocity model. For example, migration velocity analysis (MVA) is a process of estimating velocities in the depth domain (also called the "image" domain, in contrast to the time domain) by performing several iterations of the following three-step process: (1) one or more seismic data gathers are migrated to depth using the current best estimate of the velocity model (e.g., the initial velocity model or a previous iteration of the velocity model); (2) the prestack images are analyzed for residual moveouts (e.g., errors); and (3) the measured errors are inverted into an updated velocity model by a tomographic inversion process.

FIG. 1 illustrates a flowchart of a method 100 of creating a high-resolution velocity model of a geological medium using seismic data and others (e.g., well-log data, rock physics data, etc.), in accordance with some embodiments. In some embodiments, method 100 is used to detect locations of velocity anomalies in the geological medium to mitigate potential drilling hazards. As shown in FIG. 1, objects with square edges represent different data processing operations (e.g., steps) in method 100, while objects with rounded edges represent inputs and/or outputs of the operations (e.g., steps) in method 100. Dashed lines indicate that the object is optional, while solid lines indicate that the object is required, in accordance with some embodiments. For ease of explanation, method 100 is described as being performed by a velocity modeling system, such as velocity modeling system 200 (FIG. 2), although in various embodiments, certain operations described with respect to method 100 are distributed across separate computer systems.

The computer system performs seismic tomography 102 on one or more seismic data gathers to generate a long-wavelength velocity model 103. In some embodiments, the seismic tomography 102 uses arrival times from a plurality of traces included in the one or more seismic data gathers to generate the long-wavelength model 103 (e.g., through a process of moveout picking). The seismic data gathers are optionally obtained in, for example, a land or marine seismic survey. The seismic data gathers as well as the long-wavelength velocity model 103 are optionally stored in memory (e.g., in data sub-module 226, FIG. 2). In some embodiments, the seismic tomography 102 is an iterative process that employs, for example, migration velocity analysis (MVA) as described above. In some embodiments, the long-wavelength velocity model 103 includes acoustic wave velocities for each location on a numerical mesh or grid (also called a computational mesh or grid) of a geological medium.

In some embodiments, the computer system accesses an attenuation model 105. For example, prior to accessing attenuation model 105, the computer system performs an attenuation analysis 104 to generate attenuation model 105. The attenuation can be quantified by a frequency-independent quality-factor (Q). The attenuation still depends on frequency, in fact, often exponentially on frequency. The complexity of the attenuation analysis can range from a single constant Q model for the subsurface sediments to a spatially varying obtainable by Q-tomography. Attenuation model 105 includes one or more Q factors for each of a plurality of locations in the geological medium. The plurality of locations are, in various embodiments, a plurality of depths (e.g., attenuation model 105 is laterally homogeneous), a plurality of locations on a numerical grid or mesh (e.g., attenuation model 105 is three-dimensionally anisotropic), and/or a plurality of volume elements. For a respective location in the geological medium, attenuation model 105 may indicate frequency-dependent attenuation. In some embodiments, attenuation model 105 includes attenuation factors for a range of frequencies produced by seismic sources.

The computer system performs a model building operation 106 in which long-wavelength velocity model 103 is combined with attenuation model 105 to produce a long-wavelength velocity and attenuation model 107 (e.g., in the depth domain). In some embodiments, combining long-wavelength velocity model 103 with attenuation model 105 includes representing attenuation model 105 using the same numerical mesh or grid on which long-wavelength velocity model 103 is specified. For example, in some circumstances, attenuation model 105 includes depth-dependent Q-factors derived using attenuation analysis 104 by comparing the attenuation variations with frequency. The assumption of exponential decay of amplitudes with frequency can be used to obtain a frequency independent Q.

In some embodiments, long-wavelength velocity and attenuation model 107 produces at least two inputs into an impedance inversion operation 116. One of the inputs is a long-wavelength velocity and attenuation model 113 in the time domain and the other input is a set of one or more high-resolution image gathers 115 in the time domain. To generate the long-wavelength velocity and attenuation model 113 in the time domain, a depth-to-time conversion 110 is used to transform the long-wavelength velocity and attenuation model 107 from the depth domain to a time domain. Although method 100 indicates that the same depth to time conversion 110 is used for both operations, different conversion methods may be used.

To generate the high-resolution image gathers 115 in the time domain, the one or more seismic data gathers are migrated using the long-wavelength velocity and attenuation model 107 in the depth domain. This is done in a prestack depth migration with attenuation compensation operation 108. The result is one or more seismic image gathers 111 in the depth domain (as compared with the one or more seismic data gathers, which are in the time domain). In some embodiments, a dip-consistent depth domain filtering operation 112 is performed on the seismic image gathers 111 in the depth domain prior to converting (110) the seismic image gathers back into the time domain. The depth domain filtering 112 may remove noise or artifacts in the seismic image gathers. The resulting time domain high-resolution image gathers 115 have amplitudes that are suitable for high-resolution prestack or post-stack impedance inversion 116.

In some embodiments, the depth domain filtering 112 includes a dip- or structurally-consistent filtering operation to remove noise. Dip- or structurally-consistent filtering includes at least three steps: (1) a determination of stratus orientation (e.g., structural dips) at various locations within the geological medium; (2) a determination of edges (e.g., faults) and other sharp features in the geological medium; and (3) application of a filter that preserves the dips, edges and other sharp features (e.g., a judiciously chosen f-k filter). Thus, in some embodiments, the depth domain filtering 112 includes incorporating a structural model into the seismic image gathers 111. The result is that the filtered seismic image gathers have short-wavelength structural features (e.g., sharp features).

As noted above, inputs for impedance inversion 116 include the long-wavelength velocity and attenuation model 113 and the high-resolution image gathers 115, both in the time domain. In some embodiments, during impedance inversion 116, the long-wavelength velocity and attenuation model 113 is used to locate long-wavelength structural features (e.g., such as horizons, dips, and/or edges) that represent locations of abrupt changes in impedance (e.g., locations having short-wavelength impedance components) while the amplitude portions of the high-resolution image gathers 115 are used to determine the impedance values in the vicinity (e.g., on either side of) of the locations of abrupt changes in impedance, which are referred to as "short-wavelength" impedance components. In some embodiments, the short-wavelength impedance components are combined with the estimated long-wavelength structural features to form a full-band P-wave and/or S-wave impedance model 117 in the time domain.

The computer system applies a spatial-coordinate-independent calibration 118 to the full-band impedance model 117. People familiar with the art of the inversion would know that tomography provides the long-wavelength (or low-frequency in time domain) part of the model spectrum while impedance inversion 116 provides the short-wavelength (high frequency) part of the model spectrum. The contribution from impedance inversion 116 is subject to scaling and wavelet shaping and the high-frequency tail end of the tomography spectrum varies with tomographic algorithms used. Thus the calibration is an essential step of the workflow. In some embodiments, spatially independent calibration includes using one or more frequency-spectral calibration factors determined from well-log derived velocities to produce a frequency calibrated full-band impedance model (not shown). For example, frequency-components of well-log data 109 (e.g., frequency-components of well-log velocity data) are used, in some embodiments, to adjust mid-wavelength components (e.g., in the overlapping frequency-ranges provided by seismic tomography and impedance inversion, respectively) of the full-band impedance model 117, thus resulting in adjustments that are applicable to the full volume of the geological medium rather than solely at the locations for which the well-log data is obtained. This is because the adjustments, although derived at a well location and possibility with limited depth range, are in the frequency domain and thus do not have explicit dependency on position or depth of the calibration points. This calibration relates the inverted and laterally extended geophysical properties (i.e., impedances or velocity) from inversion to those at the well location without explicit use of spatial coordinates. The same spatial coordinate independent adjustments are this applied to the entire 3D volume of full-band impedances. The frequency calibrated full-band impedance model is optionally converted to depth (time-to-depth conversion 120) and further optionally converted to a full-volume velocity model using, e.g., impedance-to-velocity conversion 122 and density values obtained in well-log data 109 in concert with the known impedances given by the frequency calibrated full-band impedance model (see Eq. (1) relating impedance, density, and velocity). In the cases where well data is not available to provide the frequency spectra, the spectra of the impedance at known high-contrast reflection boundaries such as seafloor or sediment-salt boundaries can be used.

The result is a full-volume velocity model 119 that is used, in some embodiments, for fluid pressure anomaly detection 124. For example, in some circumstances, anomalously low velocities are indicative of high fluid pressures that indicate a potential drilling hazard. Given the P and S impedances, the ratio of the P and S velocities can also be computed. The ratio has been shown to be useful for detecting shallow water flow (SWF), a form a drilling hazard.

Figure 2:
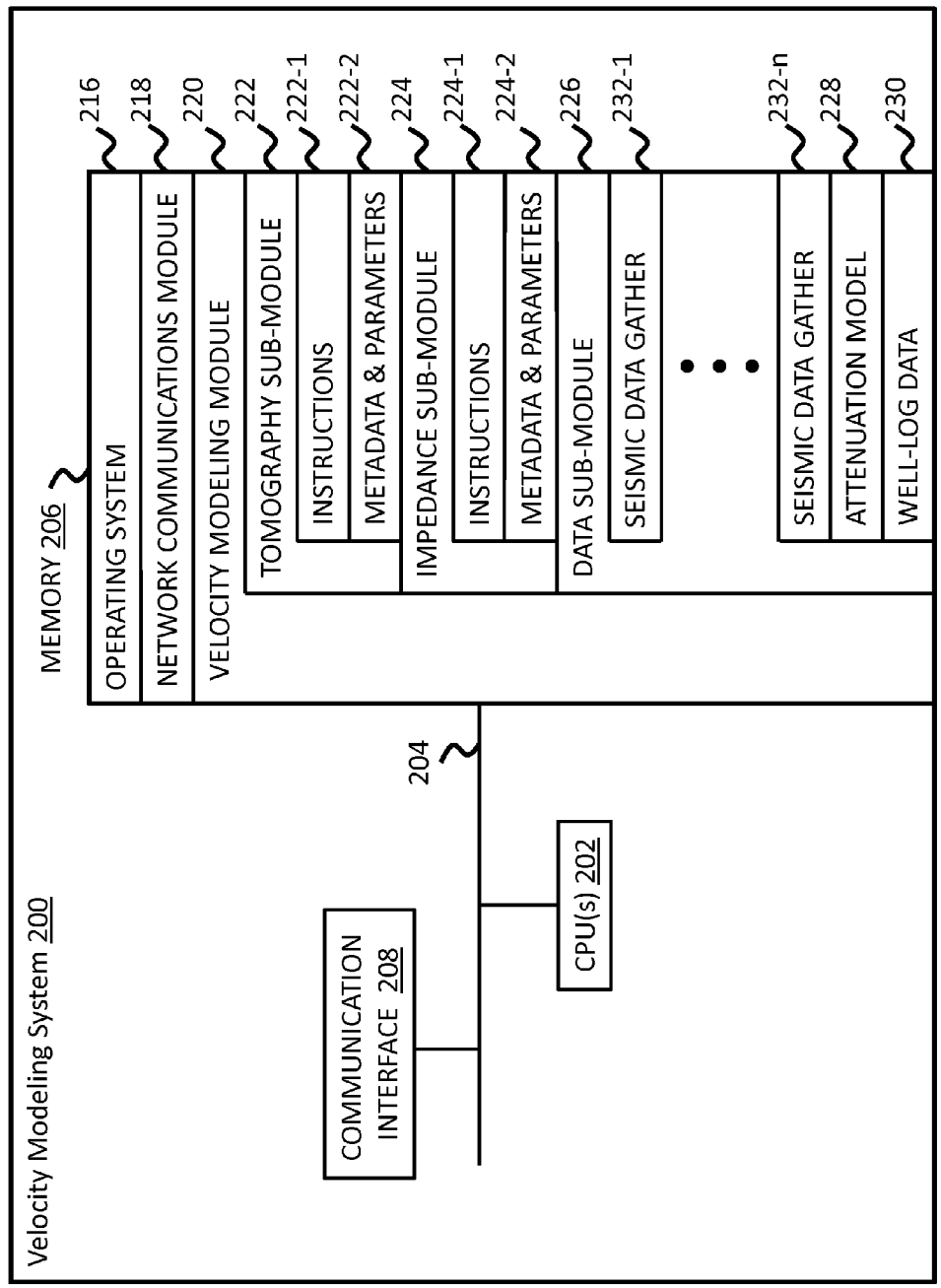
FIG. 2 is a block diagram illustrating a velocity modeling system, in accordance with some embodiments.

FIG. 2 is a block diagram illustrating a velocity modeling system 200, in accordance with some embodiments. While certain specific features are illustrated, those skilled in the art will appreciate from the present disclosure that various other features have not been illustrated for the sake of brevity and so as not to obscure more pertinent aspects of the embodiments disclosed herein.

To that end, the velocity modeling system 200 includes one or more processing units (CPUs) 202, one or more network or other communications interfaces 208, memory 206, and one or more communication buses 204 for interconnecting these and various other components. The communication buses 204 may include circuitry (sometimes called a chipset) that interconnects and controls communications between system components. Memory 206 includes high-speed random access memory, such as DRAM, SRAM, DDR RAM or other random access solid state memory devices; and may include non-volatile memory, such as one or more magnetic disk storage devices, optical disk storage devices, flash memory devices, or other non-volatile solid state storage devices. Memory 206 may optionally include one or more storage devices remotely located from the CPUs 202. Memory 206, including the non-volatile and volatile memory devices within memory 206, comprises a non-transitory computer readable storage medium and may store seismic data, well-log data, velocity models, and/or attenuation models.

In some embodiments, memory 206 or the non-transitory computer readable storage medium of memory 206 stores the following programs, modules and data structures, or a subset thereof including an operating system 216, a network communication module 218, and a velocity modeling module 220.

The operating system 216 includes procedures for handling various basic system services and for performing hardware dependent tasks.

The network communication module 218 facilitates communication with other devices via the communication network interfaces 208 (wired or wireless) and one or more communication networks, such as the Internet, other wide area networks, local area networks, metropolitan area networks, and so on.

In some embodiments, the velocity modeling module 220 is configured to generate a long-wavelength anisotropic velocity model by performing a tomographic inversion of one or more seismic data gathers (e.g., seismic data gather 232-1 through 232-n that are optionally stored in data sub-module 226) using moveout data derived from the one or more seismic data gathers. The long-wavelength anisotropic velocity model is also optionally stored in data sub-module 226 (although not shown). The velocity modeling module 220 is configured to access an attenuation model 228 (stored in data sub-module 226) that includes frequency-dependent attenuation factors for each of a plurality of locations in the geological medium. The velocity modeling module 220 is configured to correlate the long-wavelength velocity model with the attenuation model to produce a long-wavelength velocity and attenuation model. The velocity modeling module 220 is configured to perform prestack depth migration on the one or more seismic data gathers from a time domain to a depth domain using the long-wavelength velocity and attenuation model to produce one or more seismic image gathers and apply a dip-consistent filter to the one or more seismic image gathers to produce one or more filtered seismic image gathers. The velocity modeling module 220 is configured to transform the one or more filtered seismic image gathers from the depth domain to the time domain. Lastly, the velocity modeling module 220 is configured to generate a full-band impedance model for the geological medium by performing impedance inversion of the one or more filtered seismic image gathers in the time domain using the long-wavelength velocity and attenuation model. The full-band impedance model is used for detecting fluid pressure anomalies in the geological medium.

To achieve those ends, the velocity modeling module 220 includes tomography sub-module 222 having a set of instructions 222-1 and metadata and parameters 222-2 that handle tomographic inversion. The velocity modeling module 220 includes impedance sub-module 224, which includes a set of instructions 224-1 and metadata and parameters 224-2 that handle impedance. The velocity modeling module 520 optionally includes other modules, not shown, for filtering (e.g., dip-consistent filtering), correlating, performing prestack migration, etc. In some embodiments, however, the instructions for performing these tasks are included in the tomography sub-module 222 and/or the impedance sub-module 224.

In one embodiment, method 100 of FIG. 1 may be implemented in the velocity modeling system 200 of FIG. 2, thereby providing a robust workflow that computes full-band velocities for pore pressure prediction. The workflow combines low-resolution tomography results with high-resolution common-image-point gather amplitudes to generate a full-band velocity model using impedance inversion.

Method 100 is, optionally, governed by instructions that are stored in computer memory or a non-transitory computer readable storage medium (e.g., memory 206 in FIG. 2) and are executed by one or more processors (e.g., processors 202) of one or more computer systems. The computer readable storage medium may include a magnetic or optical disk storage device, solid state storage devices such as flash memory, or other non-volatile memory device or devices. The computer readable instructions stored on the computer readable storage medium may include one or more of: source code, assembly language code, object code, or another instruction format that is interpreted by one or more processors. In various embodiments, some operations in each method may be combined and/or the order of some operations may be changed from the order shown in the figures. For ease of explanation, method 100 is described as being performed by a computer system, although in some embodiments, various operations of method 100 are distributed across separate computer systems.

A computer system generates a long-wavelength anisotropic velocity model by performing a tomographic inversion (e.g., also called seismic tomography) of one or more seismic data gathers using moveout data derived from the one or more seismic data gathers. The seismic data gathers are optionally obtained in a marine seismic data acquisition scenario, a land seismic data acquisition scenario, a combination thereof, or may be synthetic seismic data generated on a computer.

In some embodiments, the one or more seismic data gathers are free of multiples. In some embodiments, this is achieved by removing multiples using filtering (e.g., f-k filtering) prior to generating the long-wavelength anisotropic velocity model.

In some embodiments, the long-wavelength anisotropic velocity model is generated and specified with respect to (e.g., output onto) a numerical mesh or grid, at least a portion of which represents a volume of the geological medium. In some embodiments, the numerical mesh or grid also includes non-physical "padding" regions at the boundary of the volume of the geological medium. The padding regions include velocities that are contrived so as to avoid non-physical reflections of seismic energy from the boundary of the volume when simulations (e.g., forward modeling) are numerically performed (e.g., as part of the iterative migration velocity analysis described below, which is used to further refine the long-wavelength anisotropic velocity model). In some embodiments, the numerical mesh or grid is a fine numerical mesh or grid, meaning that the numerical mesh or grid includes grid locations spaced at a frequency that is greater than twice the Nyquist frequency corresponding to the shortest wavelength information obtain in tomography (e.g., 4 times the Nyquist frequency or 8 times the Nyquist frequency). This prepares (e.g., makes suitable) the long-wavelength anisotropic velocity model for the addition of short-wavelength information (e.g., content).

In some embodiments, the tomographic inversion uses arrival times (e.g., kinematic data) from a plurality of traces included in the one or more seismic data gathers to generate the long-wavelength anisotropic velocity model. In some embodiments, the long-wavelength anisotropic velocity model is a 3D anisotropic velocity model. As used herein, the term "anisotropic velocity model" is used to mean a velocity model in which the velocity varies laterally or horizontally. For example, in some embodiments, the anisotropic velocity model is characterized by a tilted transverse isotropy (TTI), in which there velocities are isotropic in a direction that is transverse to a direction of tilt, and anisotropic along the direction of tilt. Moreover, the direction of tilt can vary through a 3D volume representing the geological medium.

In some embodiments, the tomographic inversion is iterative. For example, migration velocity analysis (MVA) is a process of estimating velocities in the depth image domain by performing several iterations of the following three-step process: (1) one or more seismic data gathers are migrated to depth using the current best estimate of the velocity model (e.g., the initial velocity model or a previous iteration of the velocity model); (2) the prestack images are analyzed for residual moveouts (e.g., errors); and (3) the measured errors are inverted into an updated velocity model by a tomographic inversion process. As used herein, the term tomographic inversion is intended to refer to any type of inversion based on seismic travel times, e.g., be it an iterative process such as MVA or a single-step process such as normal moveout picking. In some embodiments, analyzing the prestack images for residual moveout includes using a dip-sensitive regularization routine with a high-density of residual moveout picks.

The computer system accesses an attenuation model (e.g., a Q-factor model) that includes a plurality of locations in the geological medium. The attenuation model represents the loss of energy or amplitude of seismic waves as they pass through media (e.g., through absorption, reflection and refraction at interfaces, mode conversion and spherical divergence, or spreading of the seismic waves). In some embodiments, the attenuation model represents the loss of energy or amplitude of seismic waves due to absorption, and the other effects (e.g., reflection, refraction, and spreading of waves) are accounted for separately. The attenuation model can include P-wave attenuation values (e.g., a $Q_p$-factor model), S-wave attenuation values (e.g., a $Q_s$-factor model), or both.

In some embodiments, the attenuation model is generated using one of attenuation tomography or well-log attenuation calculation. As an example of attenuation tomography, some embodiments estimate seismic attenuation based on frequency shifts that occur in a seismic data gather. These techniques are described in more detail, for example, in Quan, Y., Harris, J. M., "Seismic attenuation tomography using the frequency shift method," Proceedings from the 63rd Annual International Meeting, Society of Exploration Geophysicists, 1997, which is hereby incorporated by reference in its entirety. In various embodiments, the attenuation tomography is carried out iteratively or jointly with the generation of the long-wavelength anisotropic velocity model. Still alternatively, in some embodiments, attenuation compensation is performed after migration.

As an example of well-log attenuation calculation, a spectral ratio method is employed, in some embodiments, by measuring changes in spectra at different depths along a borehole to calculate an attenuation factor.

The computer system combines the long-wavelength velocity model with the attenuation model to produce a long-wavelength velocity and attenuation model. In some embodiments, correlating the long-wavelength velocity model with the attenuation model includes interpolating attenuation values for a plurality of locations (e.g., borehole locations) onto a three-dimensional (3D) mesh or grid onto which the long-wavelength velocity model is specified. In some embodiments, specification of the attenuation values is done in a structurally consistent manner in accordance with a structure model (e.g., that accounts for faults, folds, and/or horizons). In some embodiments, the attenuation Q-factor is obtained by attenuation tomography.

The computer system performs prestack depth migration on the one or more seismic data gathers from a time domain to a depth domain using the long-wavelength velocity and attenuation model to produce one or more seismic image gathers. Prestack depth migration acts on individual traces within a seismic data gather and positions the seismic waves to locations of reflectors in space (e.g., depth). In some embodiments, the prestack depth migration uses an imaging process (e.g., also called a migration or forward modeling process) that is amplitude-friendly (e.g., amplitude preserving). In some embodiments, cosmetic muting, such as water-bottom or offset-dependent muting is forgone. This is advantageous because it avoids adverse effects that cosmetic muting causes on long-wavelength information in the long-wavelength velocity model.

Because the long-wavelength velocity and attenuation model also accounts for attenuation, trace amplitudes are also corrected based on the path taken by each respective trace through the geological medium. In conventional impedance inversion for reservoir analysis, attenuation is not often considered because the effect of attenuation can be accounted for by wavelet design. For drilling hazard prediction, however, the entire depth range is of interest and a time-stationary wavelet is desired. Attenuation compensation makes this possible.

The computer system applies a dip-consistent filter (e.g., a structurally-consistent filter) to the one or more seismic image gathers to produce one or more filtered seismic image gathers. Dip- or structurally-consistent filtering includes at least three steps: (1) a determination of stratus orientation (e.g., structural dips) at various locations with the geological medium; (2) a determination of edges (e.g., faults) and other sharp features in the geological medium; and (3) application of a filter that preserves the dips, edges and other sharp features (e.g., a judiciously chosen f-k filter). Thus, in some embodiments, applying the dip-consistent filter includes incorporating a structural model into the seismic image gathers. The result is that the one or more filtered seismic image gathers have short-wavelength structural features (e.g., sharp features).

When common-imaging-point (CIP) gathers are used, in some embodiments, the CIP gathers are indexed and sorted by reflection angle and/or offset into common-angle or common-offset volumes, respectively. The dip-consistent filtering is then applied to each volume. The volumes are resorted back into CIP gathers after filtering. In some embodiments, the result is that the seismic image gathers are high-resolution common-image-point gathers.

The computer system transforms the one or more filtered seismic image gathers from the depth domain to the time domain. In some embodiments, transforming the one or more filtered seismic image gathers from the depth domain to the time domain includes, for a respective trace corresponding to a seismic source/receiver pair, integrating travel time over a travel path connecting the seismic source and the seismic receiver using the long-wavelength velocity model.

The computer system generates a full-band impedance model for the geological medium by performing impedance inversion to the one or more filtered seismic image gathers in the time domain using the long-wavelength velocity and attenuation model. The full-band impedance model is used for detecting fluid pressure or fluid content in the geological medium. In some embodiments, the long-wavelength velocity and attenuation model is used to locate structural features (e.g., such as horizons, dips, and/or edges) that represent locations of abrupt changes in impedance (e.g., locations having short-wavelength impedance components) while the amplitude portions of the one or more filtered seismic image gathers are used to determine the impedance values in the vicinity (e.g., on either side of) of the locations of abrupt changes in impedance. These are referred to as "short-wavelength" impedance components. In some embodiments, the short-wavelength impedance components are combined with the long-wavelength velocity and attenuation model to form the full-band impedance model.

In some embodiments, performing impedance inversion includes using a wavelet that is designed in accordance with well-log derived velocities or that is designed in accordance with a known high-contrast boundary (e.g., top-of-salt or water bottom) in the geological medium. For example, from Eqs. (2)-(3), it can be seen that high-contrast boundaries produce strong reflections. Attenuation being ever present, in some embodiments, the attenuation model is used to correct seismic amplitudes from high-contrast reflections in order to design the wavelet for impedance inversion.

In some embodiments, using the full-band impedance model for detecting fluid pressure anomalies in the geological medium includes: deriving a full-volume velocity model in the depth domain from the full-band impedance model and analyzing the full-volume velocity model in the depth domain for spatial velocity anomalies that indicate abnormally high fluid pressures. In some embodiments, the spatial velocity anomalies that indicate abnormally high fluid pressures are low-velocity anomalies.

In some embodiments, deriving the full-volume velocity model in the depth domain includes applying a spatial-coordinate-independent calibration to the full-band impedance model using one or more frequency-spectral calibration factors determined from well-log derived velocities to produce a frequency calibrated full-band impedance model. In some embodiments, spatial-coordinate-independent calibration adjusts a frequency spectrum of the full-band impedance model with well-derived spectra or spectra of known high-contrast reflection boundaries such as seafloor or sediment-salt interfaces. The derived calibration parameters are a function of only frequency and are thus location-independent, and are applied to the three-dimensional (3D) volume of the geological medium.

In some embodiments, deriving the full-volume velocity model in the depth domain also includes transforming the frequency calibrated full-band impedance model into the depth domain to generate the full-volume velocity model. For example, in some circumstances, density values obtained from well-log data are used in concert with the impedance values given by the frequency calibrated full-band impedance model to generate the full-volume velocity model (see Eq. (1) relating impedance, density, and velocity).

In some embodiments, converting the frequency calibrated full-band impedance model to the full-volume velocity model includes using a physical rock property relationship relating impedance to velocity. For example, in some embodiments, rather than using well-log data derived density values, Gardner's relation is used to eliminate density as a variable and directly convert between impedance and velocity. Gardner's relation is given by $$\rho = AV_p^B, \qquad (4)$$

where $\rho$ is the density at a location in the geological medium, $V_p$ is the p-wave velocity at the location in the geological medium, and A and B are constants with typical values of A=0.23 and B=0.25. Alternatively, in some embodiments, a basin-specific density-volume relationship is used.

While particular embodiments are described above, it will be understood it is not intended to limit the invention to these particular embodiments. On the contrary, the invention includes alternatives, modifications and equivalents that are within the spirit and scope of the appended claims. Numerous specific details are set forth in order to provide a thorough understanding of the subject matter presented herein. But it will be apparent to one of ordinary skill in the art that the subject matter may be practiced without these specific details. In other instances, well-known methods, procedures, components, and circuits have not been described in detail so as not to unnecessarily obscure aspects of the embodiments.

The terminology used in the description of the invention herein is for the purpose of describing particular embodiments only and is not intended to be limiting of the invention. As used in the description of the invention and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, operations, elements, and/or components, but do not preclude the presence or addition of one or more other features, operations, elements, components, and/or groups thereof.

As used herein, the term "if" may be construed to mean "when" or "upon" or "in response to determining" or "in accordance with a determination" or "in response to detecting," that a stated condition precedent is true, depending on the context. Similarly, the phrase "if it is determined [that a stated condition precedent is true]" or "if [a stated condition precedent is true]" or "when [a stated condition precedent is true]" may be construed to mean "upon determining" or "in response to determining" or "in accordance with a determination" or "upon detecting" or "in response to detecting" that the stated condition precedent is true, depending on the context.

Although some of the various drawings illustrate a number of logical stages in a particular order, stages that are not order dependent may be reordered and other stages may be combined or broken out. While some reordering or other groupings are specifically mentioned, others will be obvious to those of ordinary skill in the art and so do not present an exhaustive list of alternatives. Moreover, it should be recognized that the stages could be implemented in hardware, firmware, software or any combination thereof.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the invention and its practical applications, to thereby enable others skilled in the art to best utilize the invention and various embodiments with various modifications as are suited to the particular use contemplated.

What is claimed is:

1. A computer-implemented method of creating a high-resolution velocity model of a geological medium from seismic data, comprising:
   generating a long-wavelength anisotropic velocity model
      by performing a tomographic inversion of one or more seismic data gathers using moveout data derived from the one or more seismic data gathers;

accessing an attenuation model that includes frequency-dependent attenuation factors for each of a plurality of locations in the geological medium;

combining the long-wavelength velocity model with the attenuation model to produce a long-wavelength velocity and attenuation model;

performing prestack depth migration on the one or more seismic data gathers from a time domain to a depth domain using the long-wavelength velocity and attenuation model to produce one or more seismic image gathers;

applying a dip-consistent filter to the one or more seismic image gathers to produce one or more filtered seismic image gathers;

transforming the one or more filtered seismic image gathers from the depth domain to the time domain;

generating a full-band impedance model for the geological medium by performing an impedance inversion of the one or more filtered seismic image gathers in the time domain using the long-wavelength velocity and attenuation model;

applying a spatial-coordinate-independent calibration to the full-band impedance model using one or more frequency-spectral calibration factors determined from one or more of well-log derived velocities, well-log derived impedances, and high-contrast horizons to produce a frequency calibrated full-band impedance model; and detecting fluid pressure anomalies in the geological medium using the frequency calibrated full-band impedance model.

2. The method of claim 1, wherein using the full-band impedance model for detecting fluid pressure anomalies in the geological medium includes:

deriving a full-volume velocity model in the depth domain from the full-band impedance model; and analyzing the full-volume velocity model in the depth domain for spatial velocity anomalies that indicate abnormally high fluid pressures.

3. The method of claim 2, wherein the spatial velocity anomalies that indicate abnormally high fluid pressures are low-velocity anomalies.

4. The method of claim 2, wherein deriving the full-volume velocity model in the depth domain from the full-band impedance model includes:

transforming the frequency calibrated full-band impedance model into the depth domain; and converting the frequency calibrated full-band impedance model in the depth domain to generate the full-volume velocity model.

5. The method of claim 4, wherein converting the frequency calibrated full-band impedance model to the full-volume velocity model includes using a physical rock property relationship relating impedance to velocity.

6. The method of claim 1, wherein performing impedance inversion includes using a wavelet that is designed in accordance with well-log derived velocities.

7. The method of claim 1, wherein performing impedance inversion includes using a wavelet that is designed in accordance with a known high-contrast boundary in the geological medium.

8. The method of claim 1, wherein the attenuation model is generated using one of attenuation tomography or well-log attenuation calculation.

9. A computer system, comprising:
one or more processors;
memory; and
one or more programs, wherein the one or more programs are stored in the memory and configured to be executed by the one or more processors, the one or more programs including instructions that when executed by the one or more processors cause the device to:

generate a long-wavelength anisotropic velocity model by performing a tomographic inversion of one or more seismic data gathers using moveout data derived from the one or more seismic data gathers;

access an attenuation model that includes frequency-dependent attenuation factors for each of a plurality of locations in the geological medium;

combine the long-wavelength anisotropic velocity model with the attenuation model to produce a long-wavelength velocity and attenuation model;

perform prestack depth migration on the one or more seismic data gathers from a time domain to a depth domain using the long-wavelength velocity and attenuation model to produce one or more seismic image gathers;

apply a dip-consistent filter to the one or more seismic image gathers to produce one or more filtered seismic image gathers;

transform the one or more filtered seismic image gathers from the depth domain to the time domain; and generate a full-band impedance model for the geological medium by performing impedance inversion of the one or more filtered seismic image gathers in the time domain using the long-wavelength velocity and attenuation model;

applying a spatial-coordinate-independent calibration to the full-band impedance model using one or more frequency-spectral calibration factors determined from at least one of well-log derived velocities, well-log derived impedances, and high-contrast horizons to produce a frequency calibrated full-band impedance model; and detecting fluid pressure anomalies in the geological medium using the frequency calibrated full-band impedance model.

10. The computer system of claim 9, wherein using the full-band impedance model for detecting fluid pressure anomalies in the geological medium includes:

deriving a full-volume velocity model in the depth domain from the full-band impedance model; and analyzing the full-volume velocity model in the depth domain for spatial velocity anomalies that indicate abnormally high fluid pressures.

11. The computer system of claim 10, wherein the spatial velocity anomalies that indicate abnormally high fluid pressures are low-velocity anomalies.

12. The computer system of claim 10, wherein deriving the full-volume velocity model in the depth domain from the full-band impedance model includes:

transforming the frequency calibrated full-band impedance model into the depth domain; and converting the frequency calibrated full-band impedance model in the depth domain to generate the full-volume velocity model.

13. The computer system of claim 12, wherein converting the frequency calibrated full-band impedance model to the full-volume velocity model includes using a physical rock property relationship relating impedance to velocity.

14. The computer system of claim 9, wherein performing impedance inversion includes using a wavelet that is designed in accordance with well-log derived velocities.

15. The computer system of claim 9, wherein performing impedance inversion includes using a wavelet that is designed in accordance with a known high-contrast boundary in the geological medium.

16. The computer system of claim 9, wherein the attenuation model is generated using one of attenuation tomography or well-log attenuation calculation.

17. A non-transitory computer readable storage medium storing one or more programs, the one or more programs comprising instructions, which when executed by an electronic device with one or more processors and memory, cause the device to:
  generate a long-wavelength anisotropic velocity model by performing a tomographic inversion of one or more seismic data gathers using moveout data derived from the one or more seismic data gathers;
  access an attenuation model that includes frequency-dependent attenuation factors for each of a plurality of locations in the geological medium;
  combine the long-wavelength velocity model with the attenuation model to produce a long-wavelength velocity and attenuation model;
  perform prestack depth migration on the one or more seismic data gathers from a time domain to a depth domain using the long-wavelength velocity and attenuation model to produce one or more seismic image gathers;
  apply a dip-consistent filter to the one or more seismic image gathers to produce one or more filtered seismic image gathers;
  transform the one or more filtered seismic image gathers from the depth domain to the time domain;
  generate a full-band impedance model for the geological medium by performing impedance inversion of the one or more filtered seismic image gathers in the time domain using the long-wavelength velocity and attenuation model;
  apply a spatial-coordinate-independent calibration to the full-band impedance model using one or more frequency-spectral calibration factors determined from at least one of well-log derived velocities, well-log derived impedances, and high-contrast horizons to produce a frequency calibrated full-band impedance model; and
  detect fluid pressure anomalies in the geological medium using the frequency calibrated full-band impedance model.

18. The non-transitory computer readable storage medium of claim 17, wherein using the full-band impedance model for detecting fluid pressure anomalies in the geological medium includes:
  deriving a full-volume velocity model in the depth domain from the full-band impedance model; and
  analyzing the full-volume velocity model in the depth domain for spatial velocity anomalies that indicate abnormally high fluid pressures.

19. The non-transitory computer readable storage medium of claim 18, wherein the spatial velocity anomalies that indicate abnormally high fluid pressures are low-velocity anomalies.

20. The non-transitory computer readable storage medium of claim 18, wherein deriving the full-volume velocity model in the depth domain from the full-band impedance model includes:
  transforming the frequency calibrated full-band impedance model into the depth domain; and
  converting the frequency calibrated full-band impedance model in the depth domain to generate the full-volume velocity model.

* * * * *